United States Patent
Sforzin

(10) Patent No.: US 12,461,821 B2
(45) Date of Patent: Nov. 4, 2025

(54) LOW COST HIGH PERFORMANCE LRAID

(71) Applicant: Micron Technology, Inc., Boise, ID (US)

(72) Inventor: Marco Sforzin, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/678,968

(22) Filed: May 30, 2024

(65) Prior Publication Data

US 2025/0013537 A1    Jan. 9, 2025

Related U.S. Application Data

(60) Provisional application No. 63/512,571, filed on Jul. 7, 2023.

(51) Int. Cl.
  *G06F 11/10* (2006.01)
(52) U.S. Cl.
  CPC ................... *G06F 11/108* (2013.01)

(58) Field of Classification Search
  CPC .................. G06F 11/108; G06F 11/1076
  See application file for complete search history.

(56) References Cited

U.S. PATENT DOCUMENTS

| | | | |
|---|---|---|---|
| 2022/0156145 A1* | 5/2022 | Park | G06F 11/1068 |
| 2022/0269561 A1* | 8/2022 | Yoo | G06F 3/0619 |

* cited by examiner

*Primary Examiner* — Bryce P Bonzo
*Assistant Examiner* — Xinyuan Yu
(74) *Attorney, Agent, or Firm* — Wood IP, LLC; Theodore A. Wood

(57) ABSTRACT

A memory access method with improved bandwidth efficiency for reliability, availability, and serviceability (RAS) is described. The memory access method includes, in response to a memory access request, obtaining, using a first access granularity, a sub-stripe from a stripe of data stored on a plurality of memory media components arranged in a redundant array of independent data (RAID), and detecting an error in the sub-stripe of the data. The method further includes, in response to the detecting the error, obtaining, using a second access granularity, the stripe of the data from the plurality of memory media components, wherein the second access granularity is larger than the first access granularity. Corresponding devices are also described.

20 Claims, 11 Drawing Sheets

LOW COST HIGH PERFORMANCE LRAID

CROSS-REFERENCE TO RELATED APPLICATION

This application claims benefit to U.S. Provisional Patent Application No. 63/512,571 filed Jul. 7, 2023, the disclosure is incorporated herein by reference in its entirety.

FIELD OF TECHNOLOGY

The present disclosure relates to memory media of locked redundant array of independent devices (LRAID) types. In particular, the present disclosure relates to LRAID with reliability, availability, and serviceability (RAS) features for memory media.

BACKGROUND

Memory media (also referred to as "memory media devices") are widely used to store information in various electronic devices such as computers, user devices, wireless communication devices, cameras, digital displays, and the like. Information is stored by programing memory cells within a memory media device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory media device, a component may read, or sense, the state of one or more memory cells within the memory media device. To store information, a component may write, or program, one or more memory cells within the memory media device to corresponding states.

Various types of memory media devices exist, including magnetic hard disks, random access memory (RAM), read-only memory (ROM), dynamic RAM (DRAM), synchronous dynamic RAM (SDRAM), static RAM (SRAM), flash memory, and others. Memory media devices may be volatile or non-volatile. Volatile memory cells (e.g., DRAM cells) may lose their programmed states over time unless they are periodically refreshed by an external power source. DRAM is organized as an array of storage cells with each cell storing a programmed value. SRAM memory may maintain their programmed states for the duration of the system being powered on. Non-volatile memory cells (e.g., Not-And (NAND) memory cells) may maintain their programmed states for extended periods of time even in the absence of an external power source.

RAS features are important considerations in many digital memory storage environments. The explosive growth of Internet content and the resulting data storage and computation requirements have resulted in the deployment of heterogeneous and sometimes complex data storage solutions in large-scale data centers, organizations, home computing environments, and even mobile computing environments. The increasing scale, intensity of use, criticality of applications etc. of such deployments bring their RAS capabilities into increasing focus.

In some modern deployments, even traditionally infrequent errors start to become visible as the aggregate volume of components and bits stored or transferred continue to increase. As the number of repair events that require replacing hardware should be kept to an absolute minimum, there is the need to identify failing components clearly and definitively, and minimize the time spent in repair.

Reliability is defined as the ability to provide correct service. One way to design a system to be reliable is to be able to detect and correct faults that may otherwise cause an error. An example of such a design is to use Error Correcting Codes (ECC) to detect a fault at a specific location in memory and correct it before the data stored in that location is consumed by a processor. Reliability is often expressed in terms of Mean Time Between Failures (MTBF), Mean Time To Failure (MTTF), or Failures in Time (FIT).

Availability is defined as the ability to be ready to provide correct service, possibly under degraded capability or performance. An approach to attaining availability is to recover from an error so that the service is not interrupted due to the error. Using the memory example above, if an error is detected but is not correctable by ECC, one may offline (retire) the physical page that contains that specific memory address in the operating system so that that no future data is allocated to that location. In case recovery is not successful and the machine crashes and resets itself, then this would result in some duration of downtime, implying the system is unavailable during such downtime. One way to quantify availability is in terms of the "number of nines". For example, an Availability of 5 nines implies the system is up 99.999% of the time, i.e., approximately 5.25 minutes of downtime over one year of system operation.

Serviceability is defined as the ability to diagnose and repair faults that may cause (or may have caused) an error. For example, memory repair techniques that allow a memory location that has an uncorrectable permanent fault to be physically repaired by replacing it with a spare would provide for serviceability. Serviceability may be "online", where the system continues to be available, or "offline", where the system is not available while being serviced.

The specific mechanisms used to attain RAS may be a mixture of process technology, architecture, firmware, system software, libraries, and potentially application software. Designing for RAS for a multitude of use cases is enabled by standards such as, for example, the Compute Express Link™ (CXL™) ecosystem, that standardization of certain canonical RAS features, a high degree of visibility into errors and other RAS-related events within a set of components interconnected by the CXL fabric, and the ability to log and communicate these events in a standardized manner to the host to enable RAS actions at the platform level and within operational flows at the data center level.

CXL specifies standards for systems-on-chip (SoC), memory, storage, networking, etc. CXL enables a system vendor to populate memory media devices, with differing internal architectures and media technologies in the same platform. One could also populate different coherent accelerators, each with a potentially different type of local memory and from different vendors. The CXL standard defines multiple RAS features, enabling all members within this rich, heterogenous ecosystem to innovate in their domains and still interoperate ultimately leading to RAS design points that meet the current and emerging end-user requirements.

Memory media failures can be classified in 2 classes—random (e.g., single bit) errors and periphery errors. Random errors can be soft errors or hard errors and can be in memory array or on the data link. Periphery errors are caused by such aspects as, for example, neutron strikes, defects in latches, metal contamination, and imbalance in sense amplifiers. As noted above, system resilience is typically determined in accordance with the RAS criteria. According to RAS criteria, reliability from random and periphery errors is provided by 3 mechanisms: ECC—works on payloads composed of bits coming from a single memory media die; low power chipkill (LPCK)—corrects an entire die failure and provides countermeasure for periphery errors in the memory media; and cyclic redundancy check (CRC)—protects the CXL link and avoids errors reaching the host.

Memory media devices are arranged in schemes such as redundant arrays of independent data (RAID) to spread or stripe data over several memory media devices to improve the access speeds and reduce the possibility of errors. LRAID systems accesses memory media devices arranged in RAID configurations at certain configured access granularities. Although LRAID provides advantages in speed and reliability, some configurations require accessing a substantially larger amount of data in the memory media devices to obtain the much smaller amount of data necessary for read or write request thereby leading to heavy utilization of the interface to memory media devices.

In view of the above described importance of RAS capabilities, improved solutions for providing such capabilities in LRAID memory media device arrangements are needed.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

Memory solutions in which multiple memory media devices (e.g., DRAM or other emerging memory dice) are incorporated in, or are associated with, one memory device, such as, for example, a memory controller, are growing in scale and importance. With such growth, the effective and efficient implementation of RAS capabilities in such memory solutions become increasingly important.

Embodiment of this disclosure are directed to accessing a plurality of memory media devices that are arranged as a RAID organization. Example embodiments provide for efficient error detection and correction, and thus RAS with improved bandwidth utilization. Some embodiments provide CXL-compliant memory devices that take advantage of the RAS capabilities of CXL.

Figure 1:
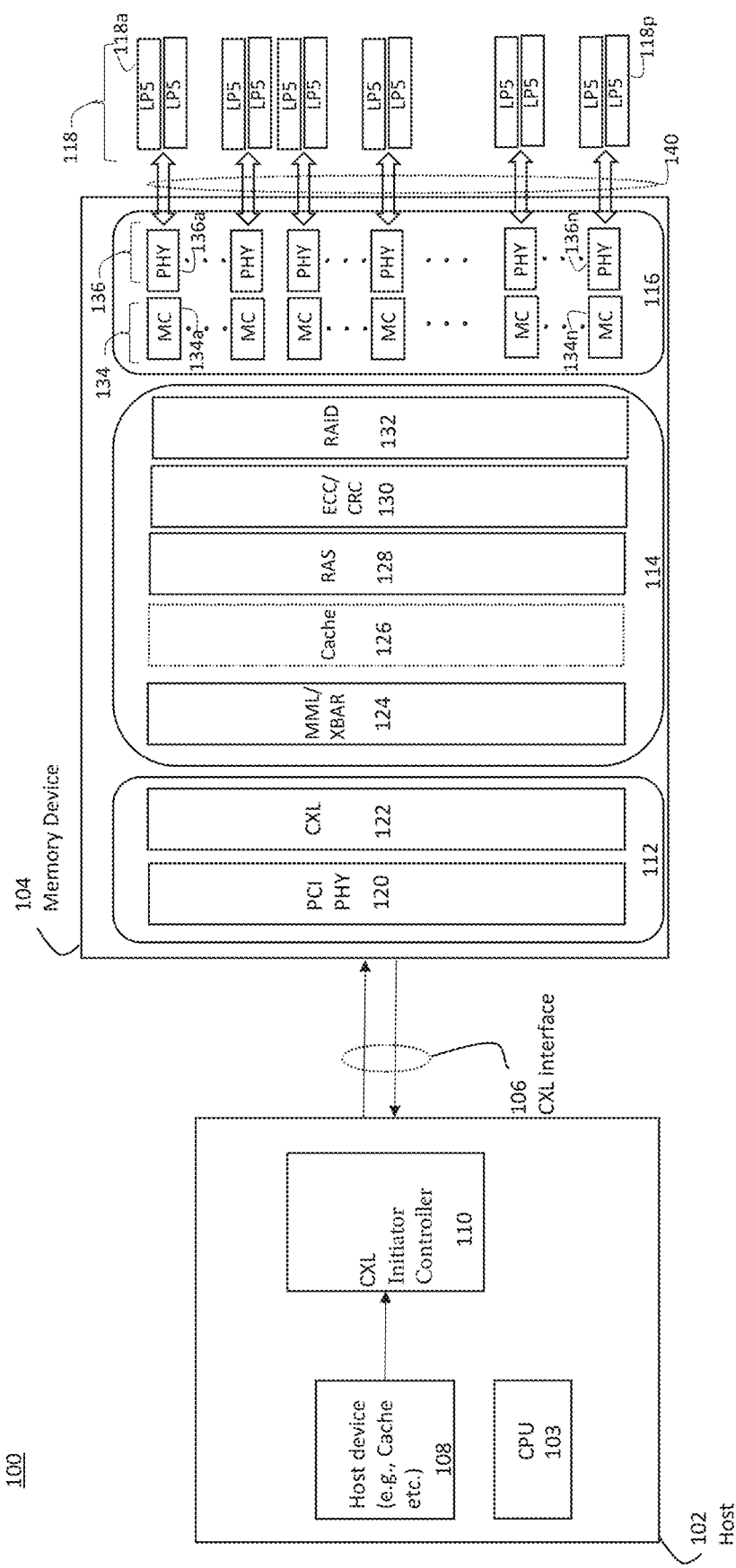
FIG. 1 illustrates an example functional block diagram of a computing.

FIG. 1 illustrates an example functional block diagram of a computing system 100 that includes an interface host CXL initiator controller 110, a target CXL controller 122, and a CXL communication interface 106 connecting the host and the target CXL device that are configured to improve bandwidth utilization for data requests in RAS-enabled LRAID memory arrangements in accordance with example embodiments of the present disclosure. According to an embodiment, CXL communication interface 106 is a CXL interface that is configured to connect the CXL initiator (also referred to as CXL host or CXL master) controller 110 and target (also referred to as CXL slave) CXL controller 122 in accordance with, for example, the CXL 2.0 and/or CXL 3.0 protocol specifications. Example embodiments, however, are not limited to the mentioned versions of CXL, or to the CXL protocol.

Host 102 may be a computer or the like with one or more processors 103 (e.g., central processing unit (CPU), graphics processing unit (GPU), application specific integrated circuit system (ASIC), field programmable gate array (FPGA), or another type of processor). Host 102 may further include a host component device 108 such as, for example, a cache memory.

Host 102 may be configured to access a device, such as, for example, a memory device 104, such as, for example, a memory controller or a system-on-a-chip (SoC) that includes a memory controller. Memory device 104 may include one or more memory media devices 118 such as DRAM modules which may be LPDDR, DDR, or other type of DRAM. In some embodiments, the memory device 104 may be configured as the "main memory", or some other memory, of the host 102. Example embodiments are not limited to DRAM, and may, for example, include memory devices 104 that have one or more memory media modules, or a combination of memory types.

The host 102 and the memory device 104 communicate via CXL communication interface 106. CXL communication interface 106, in some embodiments, comprises two unidirectional links, one unidirectional link on which the host 102 transmits messages to the memory device 104 and another unidirectional link on which the memory device 104 transmits messages to the host 102.

As noted above, in some embodiments, memory device 104 is a CXL-compliant memory system (e.g., the memory system can include a PCIe/CXL interface). For example, a frontend portion 112 of memory device 104 includes a PCI/PCIe interface 120 and a target CXL controller 122. The PCI/PCIe interface 120 couples the memory device 104 to host 102 through one or more input/output (I/O) lanes of the CXL communication interface 106. The communications over I/O lanes may be according to a protocol such as, for example, Peripheral Component Interconnect Express (PCIe). In some embodiments, the plurality of I/O lanes can be configured as a single port. Example embodiments may not be limited by the number of I/O lanes, whether the I/O lanes belong to a single port, or the communication protocol for communicating with the host.

CXL is a dynamic multi-protocol technology designed to support accelerators and memory devices. In the CXL protocol, Compute Express Link Layers (the link layer) is responsible for reliable transmission of transaction layer packets (TLP) across a Flex Bus link. CXL provides a rich set of protocols that include I/O semantics similar to PCIe (i.e., CXL.io), caching protocol semantics (i.e., CXL.cache), and memory access semantics (i.e., CXL.mem) over a discrete or on-package link. CXL.io is required for discovery and enumeration, error report, and host physical address (HPA) lookup. CXL.mem and CXL.cache protocols may be optionally implemented by the particular accelerator or memory device usage model.

CXL can be considered a high-speed CPU-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning.

CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface. When memory device 104 is CXL-compliant, the interface management circuitry (e.g., PCI/PCIe interface 120) associated with target CXL controller 122 (including data link and transaction control) uses CXL protocols to manage the CXL communication interface 106 which may comprise PCIe PHY interfaces.

Each message transferred between host 102 and memory device 104 over CXL communication interface 106 can be broken down into smaller chunks of data structures called packets. In the examples described in this disclosure, each packet may in turn be broken down into message flow control units or "flits". A flow control mechanism may decide which message gets to flow and which message is held back. A "flit" (flow control unit) is a link-level data structure that forms a network packet or stream. A flit comprises multiple slots, and each slots contain header information or data of a message.

A flit may include one or more messages. In some embodiments, a CXL read request may occupy one (1) slot in a flit, and a CXL write request may occupy five (5) slots. For example, for the write request, one (1) slot may be occupied by the header of the wrote request and four (4) slots may be occupied by the data to be written. In the same example, in an upstream flit (i.e., a flit from the memory device 104 to host 102, a write response occupies one (1) slot since the write response does not include data, and a read response occupies five (5) slots with one (1) slot for the read response header and four (4) slots for the returned data. It should be noted that CXL specifies rules for how flit slots are to be packed.

According to the CXL protocol, a flit can be accepted or rejected at the receiver side based on the flow control protocol and the size of the receiver buffer. The mechanism of link-level flow control allows the receiver to send a continuous signals stream to the transmitter to control if it should keep sending flits or stop sending flits. When a packet is transmitted over a link, the packet will often need to be split into multiple flits before the transmitting begins.

For CXL.cache and CXL.mem, layouts, such as, for example, a 528-bit flit layout is specified. Flit packing rules for selecting requests from internal queues to fill the available slots (e.g., 3 slots per flit in one example CXL implementation, 16 slots in another example CXL implementation) in the flit are also specified. Other features described for CXL.cache and CXL.mem include a retry mechanism, link layer control flits, CRC calculation, and viral and poison. A key benefit of CXL is that it provides a low-latency, high-bandwidth path for an accelerator to access the system and for the system to access the memory attached to the CXL device.

Flex Bus provides a point-to-point interconnect that can transmit native PCIe protocol or dynamic multi-protocol CXL to provide I/O, caching, and memory protocols over PCIe electricals. The primary link attributes include support of the following features: native PCIe mode, full feature support as defined in the PCIe specification; CXL mode, as defined in this specification; Configuration of PCIe vs CXL protocol mode; Signaling rate of 32 GT/s, degraded rate of 16 GT/s or 8 GT/s in CXL mode; Link width support for ×16, ×8, ×4, ×2 (degraded mode), and ×1 (degraded mode).

When operating as a CXL interface based on PCIE 5.0/6.0, CXL communication interface 106 comprises a pair of unidirectional links—each contributing to system bandwidth. CXL 2.0 provides an interface which leverages PCIE 5.0 (32 GT/s), and CXL 3.0 leverages PCIE 6.0 (64 GT/s) in each direction. According to some embodiments in which the CXL communication interface 106 operates in accordance with CXL, the memory device 104 is a CXL Type 3 device. This means that the interface operates in a host-target (also referred to as master-slave) mode in which the CXL initiator controller 110 in host 102 operates as host and the target CXL controller 122 in the memory device 104 operates as target. In the embodiments, in which the memory device is a CXL Type 3 device, all requests (e.g., read requests and write requests) are initiated by the host 102 and the memory device 104 responds to such requests. Example embodiments, however, are not limited to host-target configurations.

Multiple requests and data are transported over the CXL communication interface 106 in flits, which, in some embodiments, are fixed width flits. The host (e.g., CXL Initiator) is responsible for generating requests to the memory device (e.g., CXL target). The memory device has a CXL controller to unpack the flit requests incoming from the host and forward the requests to the central controller and backend memory media (e.g., DRAM). Each flit in CXL 2.0 is of 528 bits (4 slots each of 16 B+2 bytes for CRC=66 B or 528 bits).

Each flit in CXL 3.0 is of 256 B (16 slots each of 16 B where 238 B in each flit is for TLP Payload and 18 B is for CRC and forward error correction (FEC)). In some embodiments, in CXL 3.0, 15 out of the 16 slots can be used for multiple requests and data. In example embodiments, the CXL initiator controllers 110 and target CXL controller 122 are configured to implement the functionality required by CXL. For example, CXL initiator controllers 110 and target CXL controller 122 operate to package messages or TLP into flits for transmission over the CXL communication interface 106, and to unpack flits received over the CXL communication interface 106 to obtain the transmitted messages.

According to some embodiments, memory media devices 118a, 118b, . . . , 118p (collectively or sometimes individually referred to as 118, p is any number greater than or equal to 2) includes one or more DRAM devices, which, as noted above, may be of a type such as DDR, LPDDR, etc. without limitation. In some embodiments, the main memory for computing system 100 is stored in DRAM cells that have high storage density. DRAM cells lose their state over time. That is, the DRAM cells must be refreshed periodically, hence the name Dynamic. DRAM is organized according to a hierarchy of storage organization comprising a dual in-line memory module (DIMM), rank, bank, and array.

A DIMM comprises a plurality of DRAM chips, and the plurality of chips in a DIMM are organized into one or more "ranks." Each chip is formed of a plurality of "banks." A bank is formed of one or more "rows" of the array of memory cells. All banks within the rank share all address and control pins. All banks are independent, but in some embodiments only one bank in a rank can be accessed at a time. Because of electrical constraints, only a few DIMMs can be attached to a bus. Ranks help increase the capacity on a DIMM.

In example embodiments, multiple DRAM chips are used for every access to improve data transfer bandwidth. Multiple banks are provided so that the computing system can be simultaneously working on different requests. To maximize density, arrays within a bank are made large, rows are wide, and row buffers are wide (8 KB read for a 64 B request). Each array provides a single bit to the output pin in a cycle (for high density and because there are few pins). DRAM chips are often described as xN, where N refers to the number of output pins; one rank may be composed of 8×8 DRAM chips (e.g., the data bus is 64 bits). Banks and ranks offer memory parallelism, and the memory device 104 may schedule memory accesses to maximize row buffer hit rates and bank/rank parallelism.

In some embodiments, the memory media devices 118 is low power double data rate (LPDDR) LP5 or other similar memory interfaces. However, embodiments are not limited thereto, and memory media devices 118 may comprise one or more memory media of any memory media type, such as, but not limited to, types of DRAM.

Memory device 104 includes memory media controllers and other circuitry to control, in response to receiving a request or command from host 102, performance of a memory operation. The memory operation can be a memory access operation to read data from, or write data to, memory media devices 118.

A backend portion 116 of the memory device 104 can include a plurality of media controllers 134 (134a . . . 134n, n being any number 2 or greater) and a plurality of PHY interfaces 136 (136a . . . 136n) such that each of the media controllers 134 controls a group of one or more memory media devices 118 via a respective one of the PHY interfaces 136. Each of the plurality of media controllers 134 can receive the same command (e.g., command to read or write memory media devices 118) and address and drive the plurality of channels connecting to the memory media substantially simultaneously.

By using the same command and address for the plurality of media controllers, each of the plurality of media controllers 134 can utilize the plurality of channels to perform the same memory operation on the same plurality memory cells. Each of the media controllers 134 and/or each set of one or more channels of a plurality of channels, can be associated with a corresponding RAID array.

As used herein, the term "substantially" intends that the characteristic need not be absolute but is close enough so as to achieve the advantages of the characteristic. For example, "substantially simultaneously" is not limited to operations that are performed simultaneously and can include timings that are intended to be simultaneous but due to manufacturing limitations may not be precisely simultaneously.

For example, due to read/write delays that may be exhibited by various interfaces (e.g., LPDDR5 vs. PCIe), media controllers that are utilized substantially simultaneously may not start or finish at exactly the same time. For example, multiple media controllers can be utilized such that they are writing data to the memory devices at the same time, regardless of whether one of the media controllers commences or terminates prior to the other.

The backend portion 116 is configured to couple to memory media devices 118 via (e.g., through) a plurality of channels 140, which can be used to read/write data to/from the memory media devices 118, to transmit commands to memory media devices 118, to receive status and statistics from memory media devices 118, etc. The backend portion includes a media controller portion comprising one or more media controllers 134 and a physical (PHY) layer portion comprising a plurality of PHY interfaces 136 connecting the media controllers to the memory media devices 118. In some embodiments, the backend portion is configured to couple the PHY interfaces 136 to a plurality of memory ranks of the memory media devices 118.

Memory ranks can be connected to the memory controller(s) 134 via a plurality of channels 140. A respective media controller 134 and a corresponding PHY interface may drive a channel to a memory rank. In some embodiments, each media controller 134 can execute commands independent of the other media controllers 134. Therefore, data can be transferred from one PHY interface through a channel to memory media devices 118 independent of other PHY interfaces and channels.

Each PHY interface 136 may operate in accordance with the PHY layer that couples the memory device 104 to one or more memory ranks in the memory media devices 118. As used herein, the term "PHY layer" generally refers to the physical layer in the Open Systems Interconnection (OSI) model of a computing system. The PHY layer may be the first (e.g., lowest) layer of the OSI model and can be used to transfer data over a physical data transmission medium. In some embodiments, the physical data transmission medium can be a plurality of channels.

As used herein, the term "memory ranks" generally refers to a plurality of memory chips (e.g., DRAM memory chips) that can be accessed simultaneously. In some embodiments, a memory rank can be sixty-four (64) bits wide and each memory rank can have eight (8) pages. In some embodiments, a page size of a first type of memory media device can be larger than a page size of the second type of memory media device. Example embodiments, however, are not limited to particular widths of memory ranks or page sizes.

Each media controller 134 may include a channel control circuitry and a plurality of bank control circuitry where a respective one of the plurality of bank control circuitry is configured to access a respective bank of the plurality of banks on the memory media device 118 accessed by the respective media controller 134.

Rank, channel, and bank can be considered hardware-dependent logical groupings of storage locations in the media device. The mapping of rank, channel and bank logical groupings to physical storage locations or rows in the memory media device may be preconfigured, or may be configurable, in some embodiments by the memory controller in communication with the memory media devices 118.

In some embodiments, each media controller of the plurality of media controllers 134 can correspond to a respective RAID array of the RAID circuitry 132. Each media controller of the plurality of media controllers 134 can also correspond to one of the plurality of PHY interfaces 136. Each PHY of the plurality of PHYs interfaces 136 can be coupled to a memory media device 118 (e.g., a DRAM). In some embodiments, each media controller of the plurality of media controllers 134 can execute commands independent of the other media controllers. Therefore, data can be transferred from a PHY layer through a channel of the plurality of channels 140 to a memory media device 118 independent of other PHYs in the plurality of PHY interfaces 136.

Memory device 104 includes a central controller portion 114 between the circuitry of the frontend portion 112 and the circuitry of the backend portion 116. The central controller portion 114 may include a media management layer/interconnect (MML layer) 124, a cache 126, RAS circuitry 128, an ECC circuitry 130 and a RAID circuitry 132.

The MML layer 124 may include a crossbar interconnection that can direct respective memory access requests to respective memory media devices 118. The cache 126 temporarily stores data associated with the performance of the memory operations to make memory accesses more efficient. In some embodiments, in response to receiving a request from host 102, data read from or written to memory media devices 118 can be stored in cache lines of a cache 126 on the memory device 104. The data in cache 126 can be written to memory media devices 118 according to various cache policies. In some embodiments, ECC circuitry 130 on the memory device is configured to provide error correction to data read from and/or written to memory media devices 118.

The central controller portion 114 also includes RAID circuitry 132. The RAID circuitry 132 may include a plurality of RAID components to store the data on the memory media devices 118. As used herein, the term RAID components generally refers to data storage virtualization technology that combines multiple memory media components ("media components") such as physical memory chips, memory banks, or other memory unit, into one or more logical units for the purposes of data redundancy, performance improvement, or both.

In some embodiments, the central controller portion 114 and/or the RAID circuitry 132 can include a finite state machine (FSM) and a plurality of RAID components, wherein the FSM is operable to increase the reliability of the data and correct errors in the data. Although illustrated as a single component, the RAID circuitry 132 may comprise a plurality of RAID components in which each RAID component controls a group of memory media devices 118 in a RAID array in accordance with an FSM.

In some embodiments, each RAID array can be coupled to circuitry from ECC circuitry 130 in a manner that is independent of the ECC/CRC processing of other RAID arrays in the RAID circuitry 132. The ECC circuitry may have the detection ability to trigger the RAID mechanism every time an error is detected in the user data pattern. Moreover, the ECC circuitry can also have an additional correction ability to correct a subset of errors detected in the decoding phase. In some embodiments, the ECC reduces to a CRC code that just allow to detect the error and trigger the RAID recovery process. In some embodiments, each RAID array controlled by the RAID circuitry 132 can correspond to a group of the media controllers of the media controllers 134.

In an embodiment, RAID circuitry 132 is configured to provide a plurality of RAID arrays, and each RAID array controls access to a group of 17 memory media devices 118. That is, a RAID array is striped across 16 memory media devices 118 with another one of the memory media devices being used for storing parity data. In this example arrangement, the group of 17 memory media devices 118 may be accessed via one of the channels 140. One or the media controllers 134 and one of the PHY interfaces 136 provide connection between the RAID array and the corresponding group of 17 memory media devices 118. This example arrangement allows a separate RAID array of the RAID circuitry 132 and a separate media controller 134 to be dedicated to each of the channels 140. A RAID state machine can implement the functionality of the RAID circuitry 132.

By dedicating a separate RAID array from the RAID circuitry 132 and a separate media controller 134 to each channel 140, each channel 140 can be driven individually and receive a separate command and address than others of the channels 140. In some embodiments, each media controller 134 executes commands independent of the other media controllers 134. This RAID architecture can provide more flexibility to the memory system in regard to how much data is written to a memory media device 118 and when the data is written to a memory media device 118 in comparison to the LPCK architecture. In some embodiments, a RAID array can be striped across multiple channels 140. If a RAID array is striped across multiple channels 140, a RAID state machine can be shared across multiple channels 140. This allows a RAID array to drive a plurality of channels 140 substantially simultaneously.

The central controller portion 114 may also comprise a security component configured to encrypt the data before storing, and to decrypt data after reading, the data in memory media devices 118. In some embodiments, the data can be encrypted/decrypted using an encryption protocol such as, for example, Advanced Encryption Standard (AES) encryption.

A management unit (not shown separately) located in the memory device 104 may be configured to control operations of the memory device 104. The management unit may recognize commands from host 102 and accordingly manage the one or more memory media devices 118. In some embodiments, the management unit includes an I/O bus to manage out-of-band data, a management unit controller to execute a firmware whose functionalities include, but not limited to, monitoring and configuring the characteristics of memory device 104, and a management unit memory to store data associated with memory device 104 functionalities. The management unit controller may also execute instructions associated with initializing and configuring the characteristics of memory device 104.

The management unit can couple, by initializing and/or configuring the memory device 104 and/or the memory media devices 118 accordingly, the memory device 104 to external circuitry or an external device, such as host 102 that can generate requests to read or write data to and/or from the memory media. The management unit is configured to recognize received commands from the host 102 and to execute instructions to apply a particular operation code associated with received host commands for each of a plurality of channels coupled to the memory media devices 118.

The RAS circuitry 128 provides RAS functionality to recover from errors and/or inform host 102 regarding errors that are detected in the RAID arrays of RAID circuitry 132 by, for example, ECC circuitry 130. For example, when a parity error is detected in data obtained from one of the RAID arrays, the RAS circuitry 128 may operate with the ECC circuitry 130 and the RAID circuitry 132 to recover the error. In another example, when an unrecoverable error is detected in such obtained data, the RAS circuitry 128 may inform the host 102 regarding the unrecoverable error (e.g., using a CXL poison message).

Figure 2:
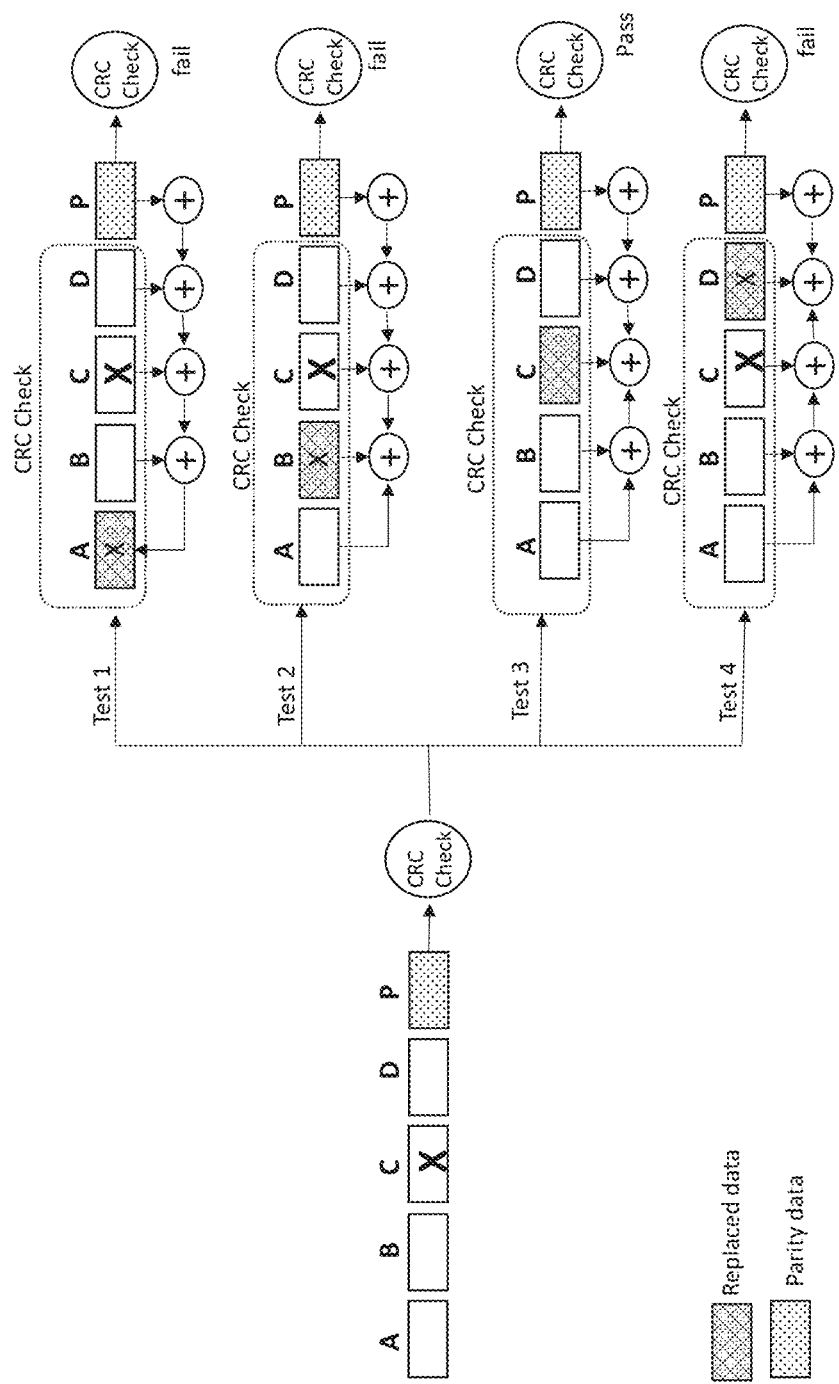
FIG. 2 graphically illustrates detection of data errors in a RAID array such as that shown in FIG. 1, according to some embodiments of the present disclosure.

FIG. 2 graphically illustrates the theory of operation of locked RAID and detection of data errors in a locked RAID array such as that shown in FIG. 1, according to some embodiments of the present disclosure.

The scenario illustrated is for an example LRAID4+1 configuration. In this configuration, memory accesses (e.g., read requests and write requests) are made to a RAID stripe (sometimes referred to simply as "stripe") comprising data (e.g., user data) stored in 4 media components and parity data that resides on another media component. A media component may be a respective one of memory media devices 118*a* . . . 118*p* (collectively and sometimes individually referred to as 118) or a respective bank of a plurality of banks of memory media devices 118. Each block A, B, C, D is from a respective media component and may be a user data block of a fixed size (e.g., 32 bytes, 64 bytes, etc.). The parity block P may be from another media device in the same RAID stripe.

In LRAID, accesses to the media components are locked at a particular access granularity. In this example, the access granularity may be considered as 32 bytes×4 media components, plus the size in bytes of the parity data P.

A read size and a burst length are defined for memory accesses. In the illustrated embodiment of FIG. 2, a burst size of 32 bytes and a read size of 1 bytes can be assumed. Thus, each read operation reads 32×1=32 bytes of data from a memory component to the cache or other part in the memory controller. Since in a RAID array, all memory components of the stripe containing the user data is retrieved in a read access, in the LRAID4+1 array scenario, 32 bytes will be read from each of the 4 data blocks A, B, C and D.

The parity data for the stripe comprises parity information for all 4 media components that are parts of the stripe. In an embodiment, the parity data may be calculated as the bitwise exclusive OR (XOR) of all the user data. More specifically, for example, the first bit of the parity data corresponds to the XOR sum of the first bit of each of the 4 data blocks (e.g., user data residing on the respective media components of the stripe), the second bit of the parity data corresponds to the XOR sum of the second bit of each of the 4 data blocks, and so on.

In configurations where the data accessed from the media components is written to a cache, a RAID stripe may be sized according to the size of a cacheline. For example, when the cache has a 256 byte cacheline, a RAID stripe may be 256 bytes, 512 bytes, etc. When a data element (e.g., particular data block) is required to be accessed in a RAID array, the entire stripe containing that data element is loaded into the cache (or elsewhere in the memory controller).

In FIG. 2, on the left, shows data obtained from the RAID stripe of 4 media components storing data (e.g., user data) and another media component storing parity data is shown. Each block A, B, C, D may be from a respective media component (e.g., respective ones of memory media devices 118*a* . . . 118*p*, collectively and individually referred to as 118) and may be a data block of a fixed size (e.g., 32 bytes, 64 bytes, etc.). The parity block P may be from another media component in the same RAID stripe. In some embodiments, the parity data may include a fixed number of bits for each data block in the stripe. For example, in an embodiment, each of the user data blocks and the parity data block in the same stripe are the same fixed size, and the parity is calculated as a bitwise XOR of all the user data blocks in the stripe.

The data transfer between the media components (e.g., memory media devices 118) and the cache (e.g., cache 126) can include error checking information such as, for example, a CRC check. CRC checking is a known error detection and correction technique that is used in data transfer. In some embodiments, CRC information for a stripe is stored in a reserved area in the media and/or cacheline in association with the user data of the stripe. In the scenario illustrated in FIG. 2, the CRC check indicates that the obtained stripe has an error. But the CRC check alone cannot identify the block that is in error.

Example embodiments utilize the characteristic that, when the parity data of a stripe is the bitwise XOR of all the user data blocks in the stripe, the user data of a particular user data block in the stripe is yielded by the summation of all the user data blocks in the stripe except for the particular user data block and the parity data.

A series of tests can be performed to determine the errored block. One test is performed for each of the blocks A, B, C, and D. The series of tests are shown on the right of FIG. 2 as Tests 1-4.

In Test 1, the data of block A is replaced by the summation of the and the other three blocks B, C and D have the initially obtained data. A is replaced with the sum of the all three remaining and adding the parity data. The CRC is recalculated after the replacement. In this scenario, since the error is in block C in the initially obtained stripe, the CRC still detects an error in the stripe of data.

In Test 2, the data of block B is replaced, and blocks A, C and D have the data from the initially obtained stripe. The CRC again indicates an error for the same reason as described in Test 1.

In Test 3, block C is replaced, with the other blocks A, B and D having the initially obtained data. In this case, the CRC indicates no error because block C, which had the error in the initially obtained data, has been replaced. This identifies block C as the errored block in the initially obtained stripe of data.

In Test 4, block D is replaced and the other blocks A, B and C have the initially obtained data. In this scenario too, the recalculated CRC indicates an error because the error is in the initially obtained block C.

During the performance of the series of tests, one would understand that the process can be stopped when the errors block is detected. In the illustrated series of tests Test 1, Test 2, Test 3 and Test 4, the series can be terminated after Test 3 and block C can be determined as the errored block.

The process described above of testing to detect the particular user data/media component that has the error identified by the CRC, and, if possible, to recover the error may be referred to below as the "multiple test".

It will be understood that although the multiple test above was described for an LRAID4+1 configuration, the process can be used to detect and optionally correct data errors in LRAID configurations of various sizes. Many of the examples described in this application use LRAID8+1 and LRAID16+1 configurations for illustration, and the multiple test can be used in each of these configurations for detecting and recovering data errors.

Figure 3:
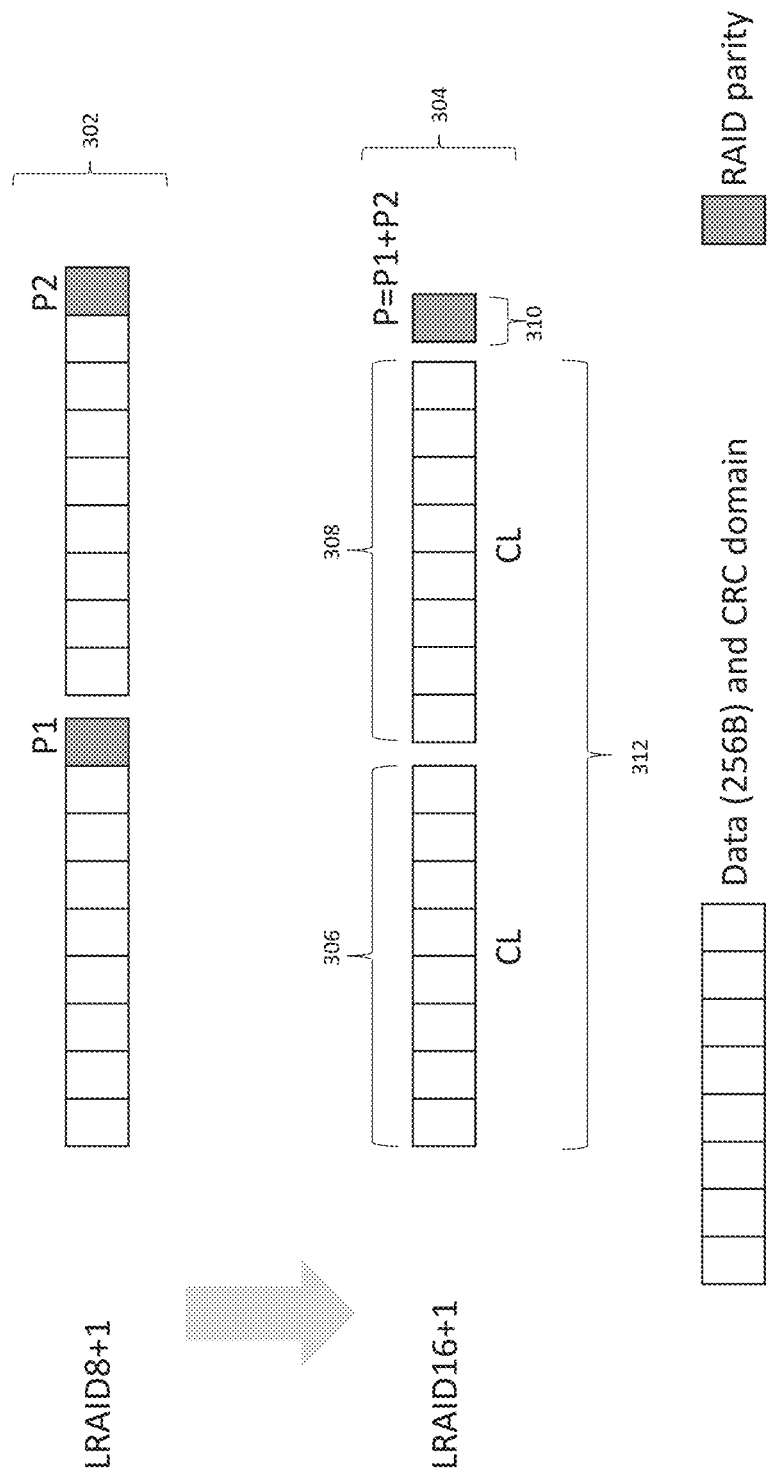
FIG. 3 graphically illustrates an example of the first memory access for data using a first granularity of access in a LRAID configuration of memory media devices such as that shown in FIG. 1, and the second memory access for recovering an error using a second granularity of access, in accordance with an embodiment of the present embodiment.

FIG. 3 graphically illustrates an example of the first memory access for data using a first access granularity, and the second memory access for recovering an error using a second access granularity, in accordance with an embodiment of the present embodiment.

A depiction illustrates a conventional use of LRAID8+1 302. In the conventional use 302, access to a particular set of 16 media components can be achieved by two separate LRAID8+1 requests, each request yielding one of the two stripes, where each stripe has the user data of 16 media components and a corresponding parity.

The depiction 304 illustrates access to that particular set of 16 memory components, according to an example embodiment. In the example embodiment, elements of the particular set can be accessed either by a LRAID8+1 request to obtain one of the LRAID8+1 stripes (data blocks) 306 or 308 as shown, or a LRAID16+1 request to obtain the stripe (data block) 312 and the parity 310. Note that the LRAID8+1 may not require parity to be returned, whereas the parity is returned for the LRAID16+1 request.

Embodiments combine the LRAID8+1 and LRAID16+1 capabilities to a two-step data access and error recovery that provides initial data access in LRAID8+1 mode with an access granularity of 256 bytes (e.g., the first access granularity) to obtain one of two 256 byte data blocks 306 or 308 (not necessarily including the parity 310). The two data blocks 306 and 308 have a 64 byte block from each media component (e.g., memory media devices 118) that is part of the 16 media device RAID stripe. The parity 310 is stored on a 17th media device that is in the same stripe. That is, the LRAID16+1 stripe is arranged over 17 media devices, with 16 of the media devices being used to store user data and one of the media devices being used to store the parity data for the user data that is striped over the other 16 media devices in that stripe.

The data request that triggers the LRAID8+1 access to the media may be a read request from host 102 that is received at the target CXL controller 122. The target CXL controller 122 and/or central controller portion 114 (e.g., MML layer 124 in the central controller portion 114) can generate the corresponding data access request to access the memory media devices 118. The RAID circuitry 132 controls the access to the LRAID to obtain the requested data from the media.

The data blocks received from the media in response to the initial read request may be written into a cacheline (e.g., a cacheline of 256 bytes) in cache 126. The parity information, if obtained, can also be stored in the cache 126.

A CRC or other check on the retrieved data can be performed, for example, by the ECC circuitry 130. If an error is detected in the convention use 302 obtained in the LRAID8+1 mode, then an attempt to recover the error can be made using the larger granularity LRAID16+1 (e.g., the second access granularity).

Therefore, one or more of the components ECC circuitry 130, RAS circuitry 128 and the RAID circuitry 132, operate to generate and transmit a LRAID16+1 request to the media devices in the RAID array. The LRAID16+1 access, in response, obtains the complete stripe of the LRAID16+1 array data blocks 312 that comprises a 64 byte block from each of the 16 media devices in the RAID array and a parity block from the 17th media device.

Although the examples of LRAID8+1 and LRAID16+1 were used to describe the two-step process of example embodiments, embodiments are not limited thereto.

Figure 4:
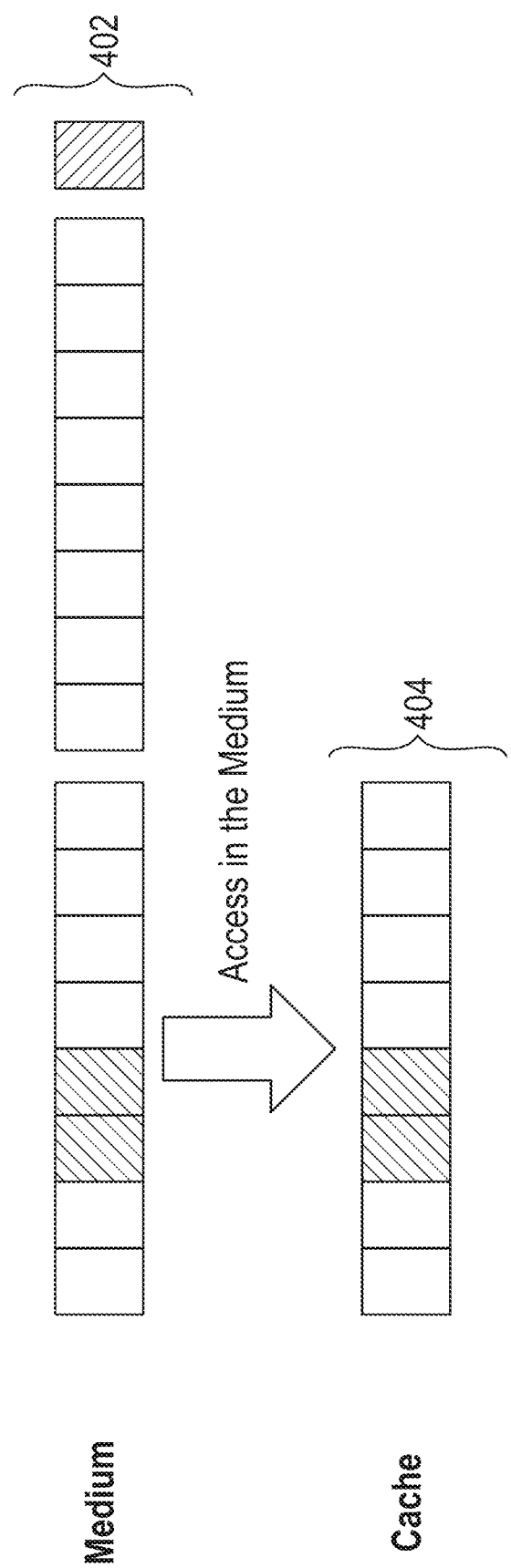
FIG. 4 graphically illustrates a scenario when the first memory access for reading data as referred to in FIG. 3 does not have data errors, in accordance with some embodiments of the present disclosure.

FIG. 4 graphically illustrates a scenario when the first memory access for reading data does not have data errors, in accordance with some embodiments of the present disclosure.

Data 402 illustrates the stripe of data comprising the 16 blocks of data and the parity data stored in respective media components. FIG. 4 illustrates that the 512 byte stripe comprises two 256 byte sub-stripes of data, where a data block of 64 bytes is stored on each of the 16 media components that are part of the RAID stripe. The parity data is the parity for the entire stripe of data. That is, the parity is calculated by considering each of the 16 data blocks (e.g., bitwise XOR of the 16 blocks).

When a read request is received, in some example embodiments, the cache may identify the media component and/or RAID array in which the requested user data is located. The cache may then obtain a cacheline (e.g., of 256 bytes) of data from that RAID array. According to an embodiment, LRAID8+1 mode access is used to access only the sub-stripe that includes the requested user data. The other sub-stripe of the stripe and the parity data that are components of the same stripe are not accessed in the initial read request.

The requested user data is present in the newly obtained cacheline of data 404. The requested user data is indicated in the figure by the two solid-filled blocks shown in data 402 that is on the media and data 404 that is in the cache. The unfilled blocks represent user data other than that which was requested, but which is in the same stripe or sub-stripe as the requested user data.

A CRC check is performed on the newly obtained cacheline of data.

In the scenario illustrated in FIG. 4, the CRC test is passed, and no errors exist in the obtained data 404. Therefore, the obtained data 404 or a portion thereof (e.g., the user data) can be returned to the requester (e.g., host 102).

Figure 5:
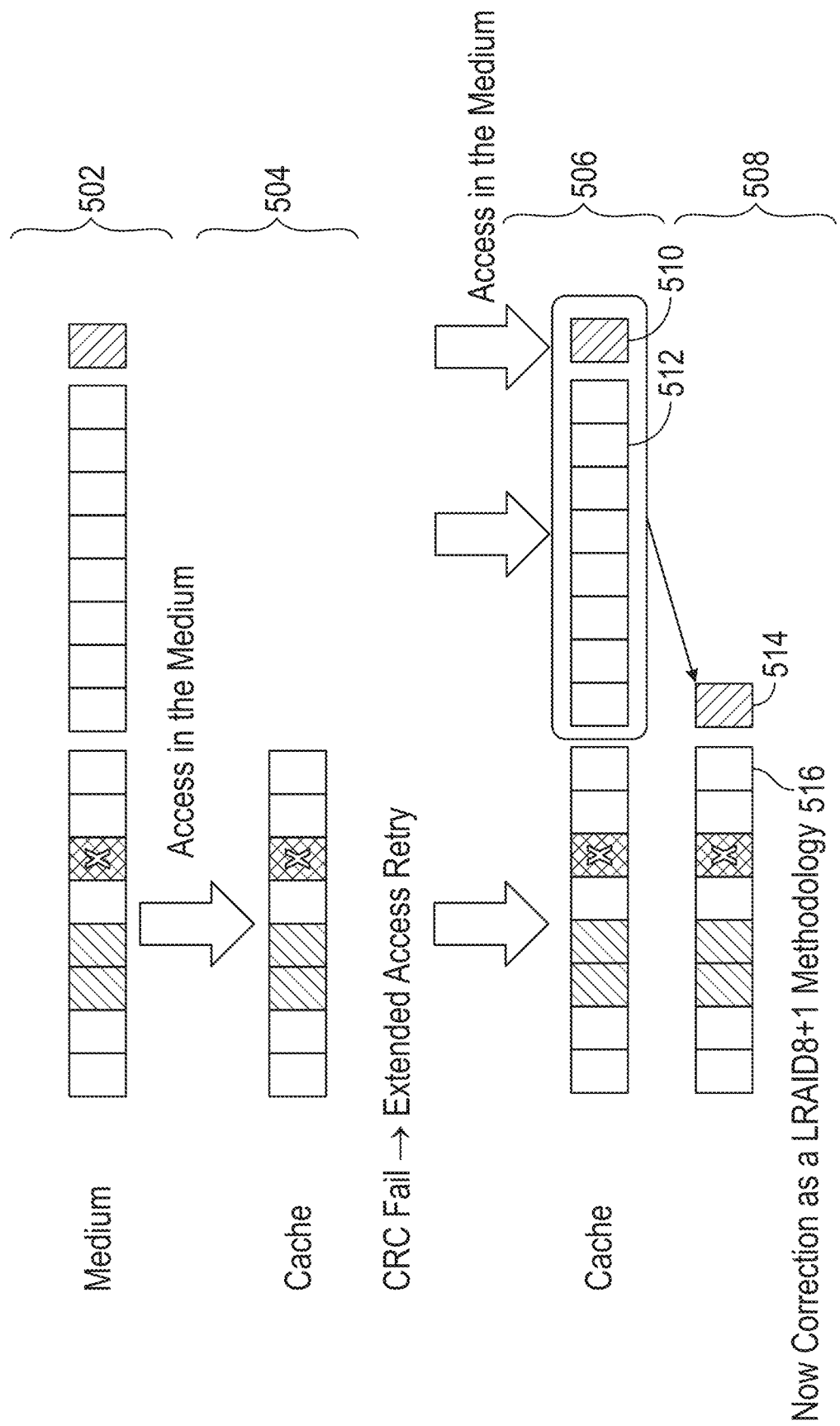
FIG. 5 graphically illustrates a scenario when the first memory access for reading data as referred to in FIG. 3 has data errors, in accordance with some embodiments of the present disclosure.

FIG. 5 graphically illustrates a scenario when the first memory access for reading data has data errors, in accordance with some embodiments of the present disclosure.

The data 502 and 504 show the initial read access to the stripe of data 502 in the media and the identified cacheline of data 504 obtained from the media in response to the read request and then stored in the cache. The initial read request and obtaining the response to the initial read request is the same as that explained with regard to FIG. 4.

In the scenario of FIG. 5, it is assumed that the CRC check fails indicating an error in the obtained cacheline of data. For purposes of clearer illustration, the "X" indicates the block that is errored, and that is required to be subsequently identified by a correctly operating system. When it is determined that an error exists in the 256-bytes of data obtained from the initial read request in the LRAID8+1 mode, the system initiates error recovery. The error recovery comprises a read retry being issued for the entire 512 bytes of the stripe, in the LRAID16+1 mode.

Data 506 is obtained from the media as a result of the read retry and is written into cache. In an embodiment, only the sub-stripe that was not previously retrieved is written into cache because the other sub-stripe (in which the error was detected) is already in the cache. As can be seen, data 506 comprises 16 blocks of 64 byte data and parity data for the stripe. The "X" indicates the cacheline of data in which the error exists. The parity data in 506 is the parity that is calculated based on all 16 blocks in the stripe.

As described above in relation to FIG. 2, given a plurality of blocks and the relevant parity data for the plurality of blocks of data, the errored block can be identified by a technique such as that shown in FIG. 2. Therefore, the system calculates the correct parity (i.e., the parity of the cacheline if not for the error) for the errored cacheline 516. The errored cacheline 516 and the corresponding calculated parity 514 are shown as data 508 in FIG. 5.

The calculated, correct parity 514 for the errored cacheline 516 can be calculated by adding, to the RAID parity 510 that is obtained from the media, the parity of the non-errored cacheline 512. Since parity data P 510 obtained from the media is the summation of P1 and P2 which are the parity of the first 256 bytes and the second 256 bytes, respectively, of the 512 byte stripe, the parity of the first 256 byte cacheline (in the illustrated scenario, the errored cacheline) alone can be determined by simply adding P2 to P.

Once the correct P1 is determined, a testing technique such as that shown in FIG. 2 can be used to identify the errored block and in some embodiments to recover the error. As in the case of FIG. 4, in FIG. 5 the requested user data is shown by the solid filled blocks.

Figure 6:
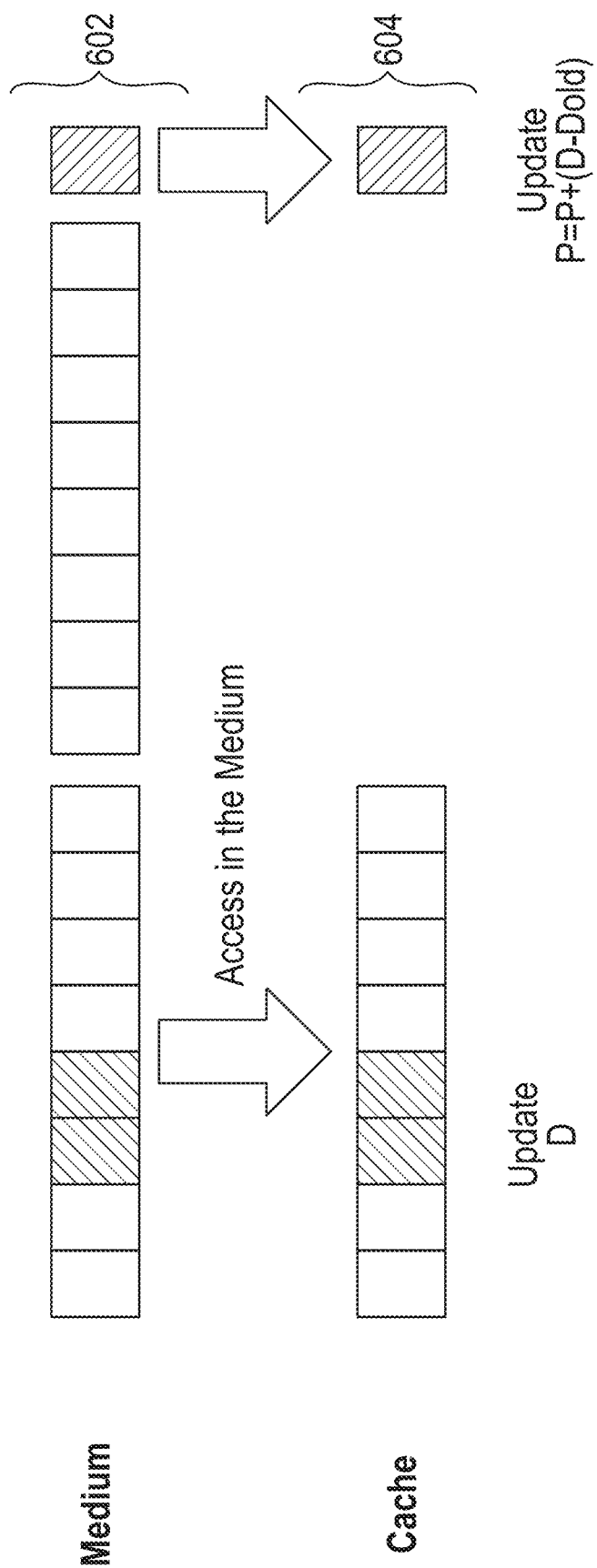
FIG. 6 graphically illustrates a scenario when the first memory access for writing data in a LRAID configuration such as that shown in FIG. 1 does not have data errors, in accordance with some embodiments of the present disclosure.

FIG. 6 graphically illustrates a scenario when the first memory access for writing data does not have data errors, in accordance with some embodiments of the present disclosure. Data 602 shows the RAID stripe in which the data blocks to be updated are located. As with FIGS. 4 and 5, the data blocks to be updated are shown in solid fill. As shown in the figure, the data to be updated is located in the first 256 bytes (i.e., the first sub-stripe) of the stripe.

To update the data, the first 256 bytes is read from the media device and written into the cache (e.g., cache 126). Additionally, since updates to the data requires the correction of the relevant parity data, the RAID parity data is also obtained from the media and stored in the cache. In the scenario illustrated in FIG. 6, the CRC test is passed and thus no error is detected. Data 604 shows the first sub-stripe of the stripe and the stripe parity as stored in the cache.

The update of the parity data can be performed by first calculating the difference between the blocks due to the update. The calculated difference between the before and after of the user data blocks (i.e., the delta between the identified blocks stored in the media and that provided in the user data with the write request), can be used to calculate a parity value and that parity value can be added to the RAID parity already obtained and stored in the cache.

The updated parity is the updated RAID stripe's parity. The data 604, that includes the user data and the updated RAID parity can subsequently be written to the media from the cache.

Figure 7:
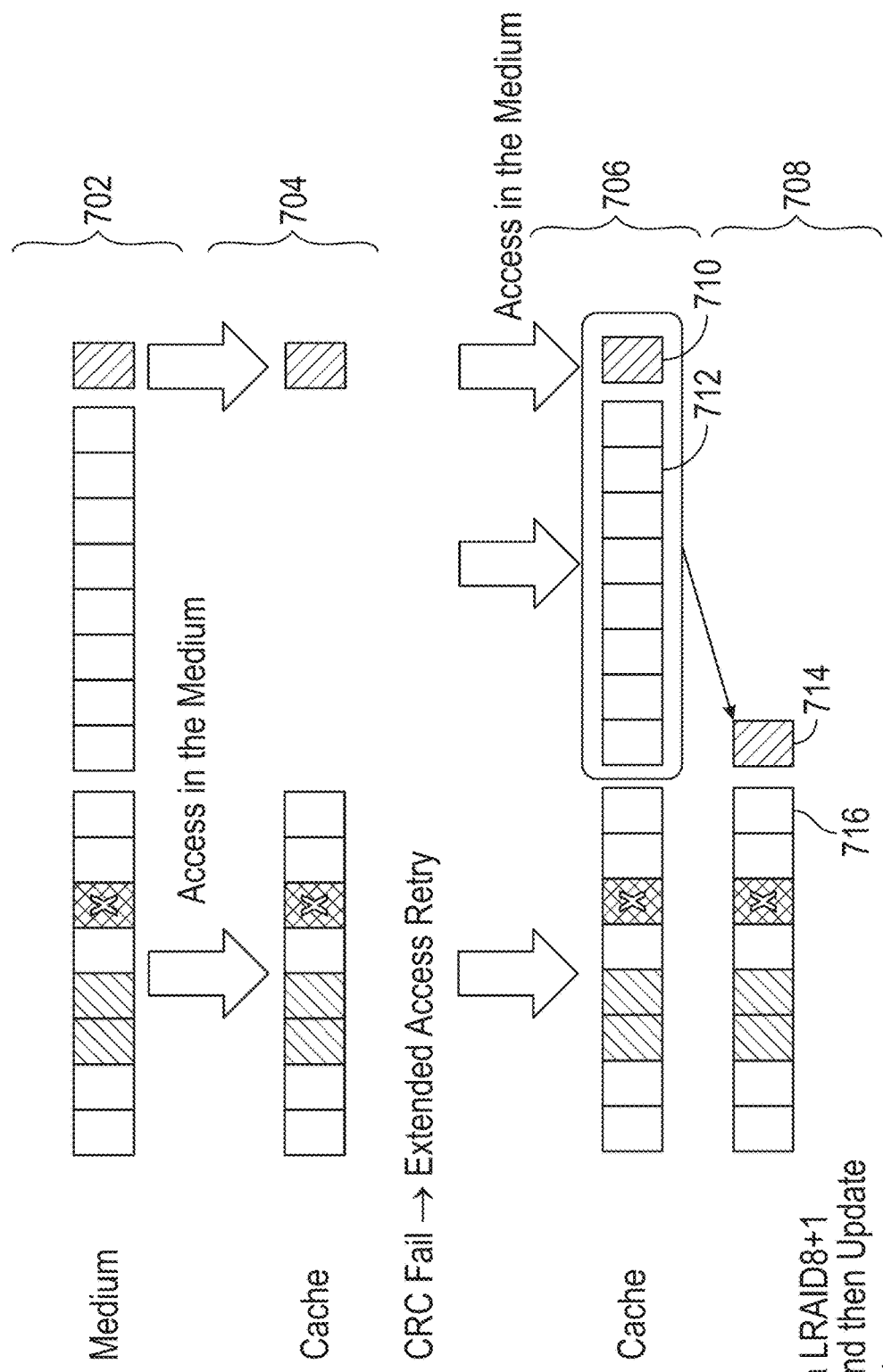
FIG. 7 graphically illustrates a scenario when a first memory access for writing data has data errors, in accordance with some embodiments of the present disclosure.

FIG. 7 graphically illustrates a scenario when the first memory access for writing data has data errors, in accordance with some embodiments of the present disclosure.

Data 702 shows the relevant RAID stripe in the media, and data 704 shows the cacheline that includes the data blocks that are to be updated with the user data in the write operation. The write access to the media obtains the first 256 byte sub-stripe from the stripe and the RAID parity for the stripe. It should be noted that, whereas it is sufficient to only obtain the first sub-stripe that has the identified data blocks from the stripe in response to a read request, the sub-stripe and the stripe's RAID parity 710 are obtained in response to a write request.

A CRC check is performed, and in the scenario illustrated in FIG. 7, it is assumed that the CRC check fails. This indicates an error in the obtained first sub-stripe now in a cacheline 716. The "X" indicates the error. The error can be detected and corrected in the same manner as described in relation to the error scenario of a read request shown in FIG. 5. The second sub-strip 712 and the RAID parity 710 are shown as 706. The errored cacheline 716 and the correct parity 714 for the errored cacheline 716 are shown as 708.

After the error is corrected, the delta of the updated data blocks can be calculated, and the updated RAID parity can be calculated as described in relation to the non-error scenario of the write request shown in FIG. 6. The updated cacheline and parity can then be written back to the media in the same manner as described in relation to FIG. 6.

Figure 8:
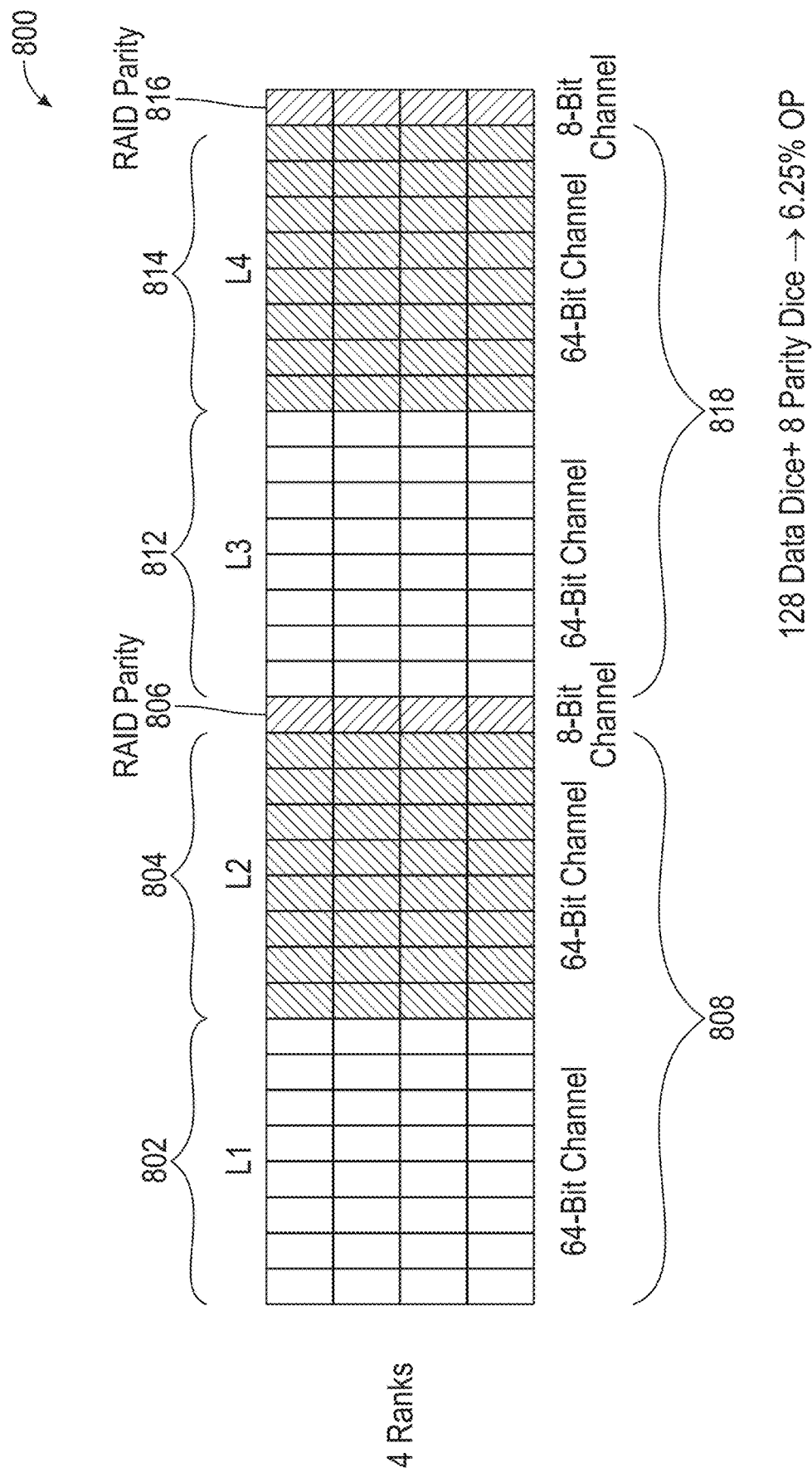
FIG. 8 illustrates memory media devices in a LRAID arrangement for LRAID16+1 with 2 LRAID8+1 sub-stripes, according to some embodiments of the present disclosure.

FIG. 8 illustrates memory devices in a Locked RAID (LRAID) arrangement for LRAID16+1 with 2 LRAID8+1 sub-stripes, according to some embodiments of the present disclosure. In the illustrated module 800 has a left side and a right side, where each of the left and right sides comprises 4 ranks of 17 dice (16 data dice and 1 parity dice) stripes. With 1 parity dice being used for every 16 data dice, a parity overhead is 6.25%.

The left side of module 800 comprises LRAID16+1 array 808 that is made up of the two LRAID8+1 arrays 802 and 804, and parity 806. The parity 806, in each rank, represents the parity for that rank across the all the dice included in LRAID8+1 802 and 804. The right side of module 800 comprises LRAID16+1 array 818 that is made up of the two LRAID8+1 arrays 812 and 814, and parity 816. The parity 816, in each rank, represents the parity for that rank across the all the dice included in LRAID8+1 812 and 814.

Each of the LRAID8+1 802, 804, 812, and 814, each of the parity 806 and 816, and each of the LRAID16+1 808 and 818 are individually accessible from a memory device, such as, for example, memory device 104. In an embodiment, each LRAID8+1 array 802, 804, 812, and 814 maps to respective 64-bit channels on the memory device and each parity die array maps to a respective 8-bit channel on the memory device.

Figure 9:
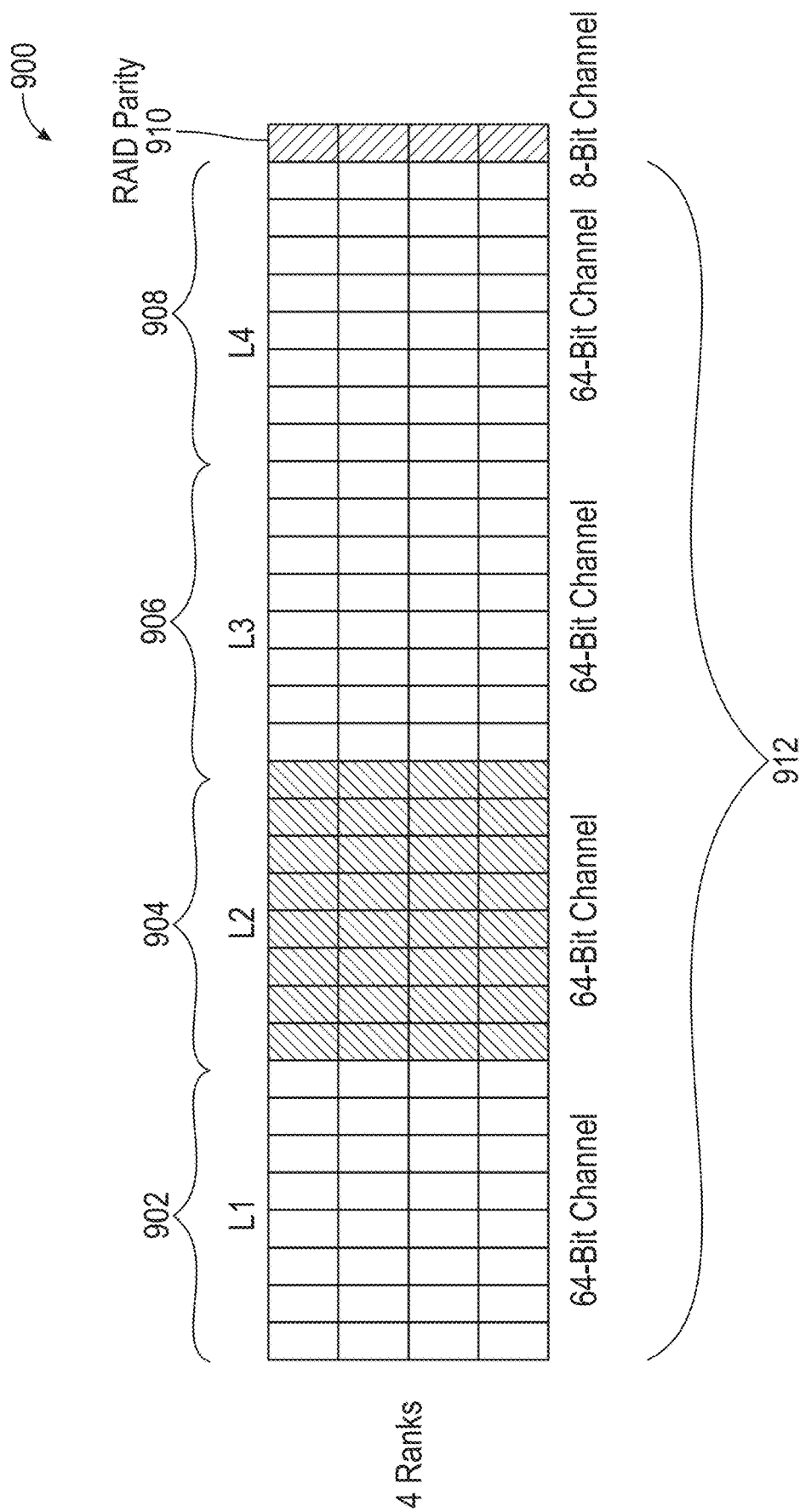
FIG. 9 illustrates memory media devices in a LRAID arrangement for LRAID32+1 with 4 LRAID8+1 sub-stripes, according to some embodiments of the present disclosure.

FIG. 9 illustrates memory devices in an LRAID arrangement for LRAID32+1 with 4 LRAID8+1 sub-stripes, according to some embodiments of the present disclosure.

The illustrated module comprises 4 ranks of 33 dice (32 data dice and 1 parity dice). As with the module 800, in module 900 each LRAID4+1 array, the array of parity dice, and the LRAID16+1 array may be individually accessible from a memory device such as, for example, memory device 104. Each of the LRAID8+1 arrays 902, 904, 906 and 908 may be mapped to a respective 64-bit channel, and the array of parity dice may be mapped to an 8-bit channel.

The parity overhead in module 900 is 1 parity dice for 33 data dice to yield a result of 3.25%, which is half of the overhead cost of module 800. Therefore, example embodiments may utilize different configurations of user data blocks and parity data blocks in LRAID stripes that yield different overhead cost levels.

Figure 10:
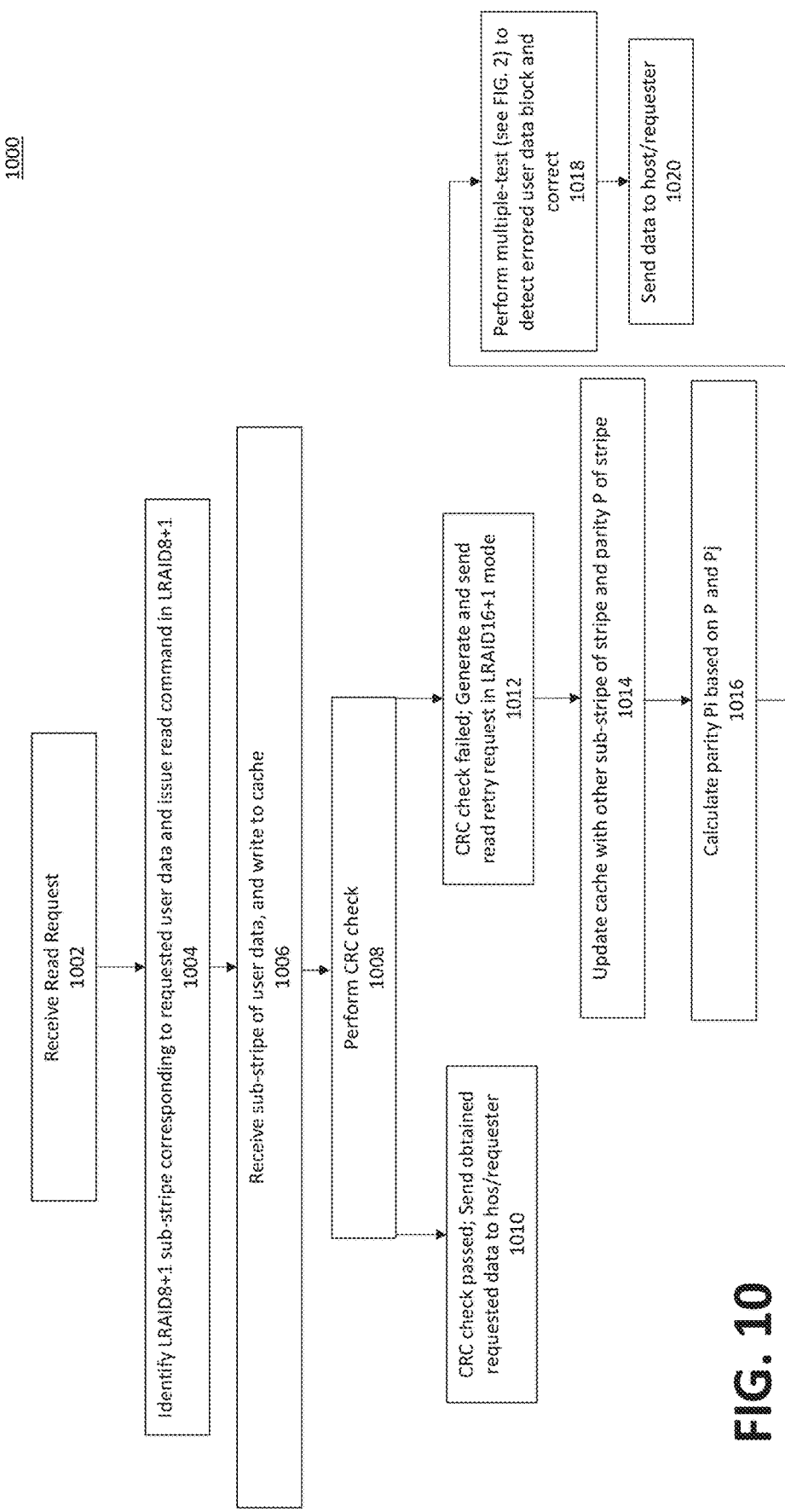
FIG. 10 illustrates a flowchart of a process performed at a target CXL-controller to service a read request in a system such as in FIG. 1, in accordance with some embodiments of the present disclosure.

FIG. 10 illustrates a flowchart of a process performed at a target CXL-controller for a read request in accordance with some embodiments of the present disclosure. Process 1000 begins when the memory controller receives, at operation 1002, a read request from a requestor (e.g., the host 102). At operation 1002, the target CXL controller 122 receives the read request.

At operation 1004, the target CXL controller 122 and/or the central controller portion 114 identifies a RAID array (e.g., identifies a sub-stripe/stripe in a RAID array) that includes the requested user data, and generates a memory read command. The RAID array may be identified based on the address of the requested user data or requested user data block.

At operation 1006, the RAID circuitry 132 accesses the identified RAID array in LRAID8+1 mode (i.e., 256 byte access granularity) to obtain a sub-stripe (e.g., 256 byte sub-stripe) of user data that includes the requested user data from the LRAID16+1 stripe. An LRAID8+1 sub-stripe includes data stored on 8 media components. Each media component of the 8 media components that are included in the LRAID8+1 sub-stripe and that stores user data provides 32 bytes of the 256 bytes of user data obtained by the central controller portion 114.

At operation 1008, the CRC is checked (i.e., CRC test is performed) for the obtained user data to determine whether an error exists in the obtained user data. Note that in some embodiments CRC information is stored as metadata in the media components and/or the cache 126. If the CRC check is passed (i.e., no error exists), then at operation 1010 the data is sent to the host (or other source from which the read request was received).

If the CRC check is failed (i.e., an error exists), then error recovery is initiated and at operation 1012, a read retry is generated and sent for the required user data by using the LRAID16+1 (e.g., 512 byte access granularity). Assume that the cacheline in which the accessed LRAID8+1 sub-stripe user data is stored (i.e., the cacheline in which the detected error exists) is CLi.

As noted above, although the CRC check on the obtained LRAID8+1 user data detects that there is an error in the obtained user data, it does not identify which of the several memory components in the stripe provided the errored user data. Thus, the process 1000 performs an error recovery process to identify and then, if possible, rectify the error in the user data.

At operation 1014, the user data obtained in response to the read retry is uploaded to the cache (e.g., cache 126). Thus, the entire LRAID16+1 stripe (parity included) is written to the cache. Thus, 32 bytes of user data from each of the 16 memory components that store user data, and an additional 32 bytes of parity data may be written to the cache 126. The LRAID16+1 parity may be referred to as P.

It should be noted that P=Pi+Pj, where P, Pi and Pj are the parities of the LRAID16+1 parity, the LRAID8+1 parity of cacheline CLi and the LRAID8+1 parity of cacheline CLj. At operation 1016, the parity Pi to use in the multiple test of CLi is calculated by adding to the LRAID16+1 parity P the whole (correct) CL j, i.e.: Pi=P+CLj. An example of the multiple test according to an example embodiment is described above in relation to FIG. 2.

At operation 1018, the error position is identified and the CLi is corrected. An example operation to identify and rectify an error in one user data block (i.e., user data obtained from one media component of a LRAID array) is described above in relation to FIG. 2 for a LRAID4+1 configuration. The operation 1018, according to an embodiment, performs a similar series of tests for each user data block in CLi. Note that CLi is the user data from an LRAID8+1 stripe. As described in relation to FIG. 2 for the scenario of LRAID4+1, in this instance, in the worst case, 8 tests (i.e., a test for each of the 8 user data blocks) are performed serially or in parallel, or in a combination thereof, with each test first replacing a respective user data block with the XOR sum of all the other user data blocks and the parity Pi. As described in relation to FIG. 2, the multiple-test processing also recovers the error in the identified user data block.

At operation 1020, the requested user data is provided to the host (or other source from which the read request was received). Note that, at operation 1014, prior to using the obtained recovery data, the process 1000 may check the CRC of CLj to improve reliability. If the CLj passes the CRC check, then the error recovery proceeds as described above. If the CLj fails the CRC check, then it is a scenario where two errors are detected in a single LRAID16+1 stripe, and the errors may be non-recoverable. In some embodiments, when a non-recoverable error is identified by the CXL controller or central controller portion 114, the host 102 is informed by sending a CXL RAS message indicating "poison" so that the host can act as deemed necessary.

Note also that one could perform read access and read error recovery using only LRAID16+1 accesses. However, in the event of an error in a LRAID16+1 stripe, the multiple tests to identify the user data block/memory component of the error would have a worst case of 16 (instead of 8 which is the worst case for LRAID8+1). Thus, the combination of LRAID8+1 and LRAID16+1 as in example embodiments, provides improved performance in error recovery compared to performing read access and read error recovery using only LRAID16+1 accesses.

Figure 11:
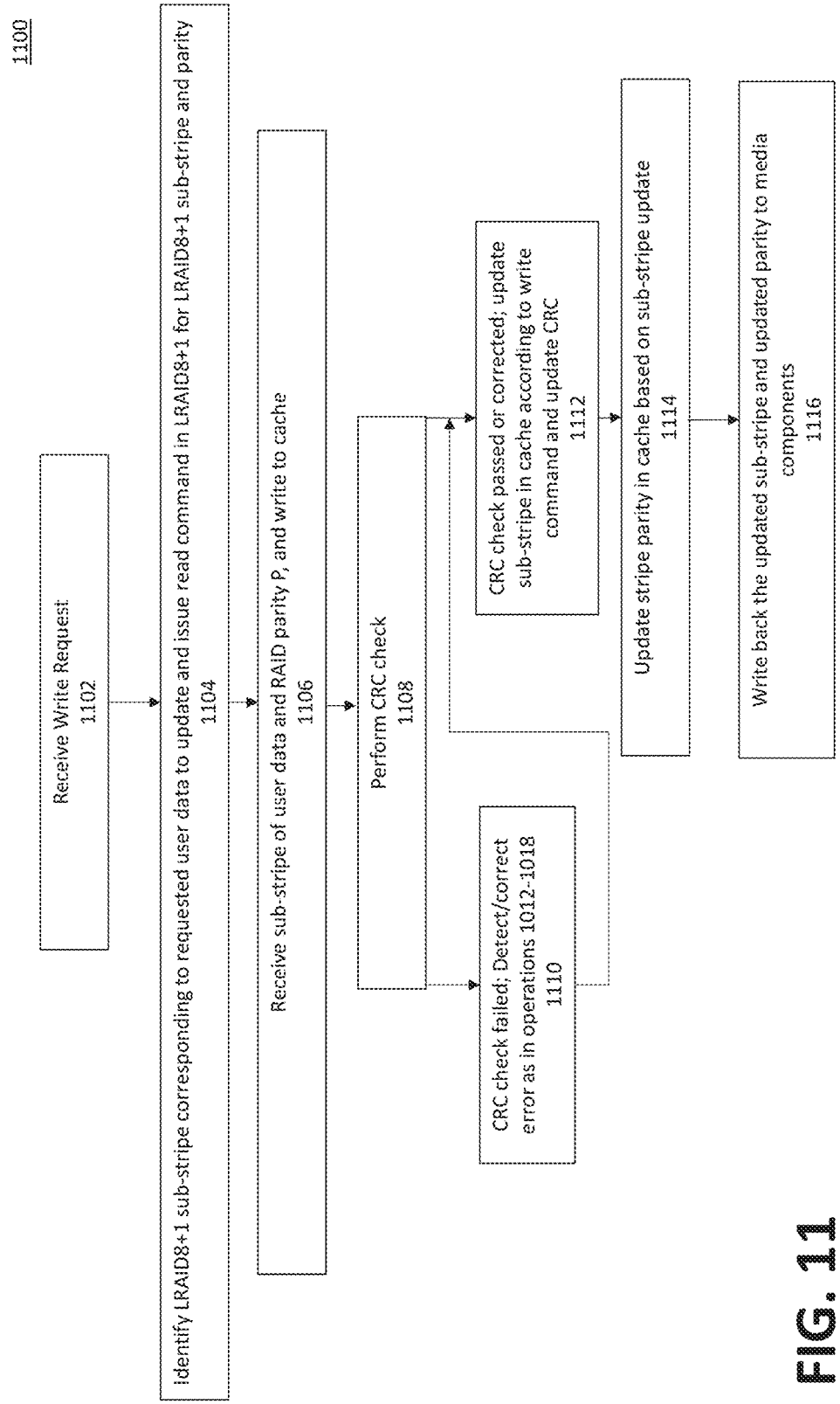
FIG. 11 illustrates a flowchart of a process performed at a target CXL-controller to service a write request in a system such as in FIG. 1 in accordance with some embodiments of the present disclosure.

FIG. 11 illustrates a flowchart of a process performed at a target CXL-controller for a write request in accordance with some embodiments of the present disclosure. Process 1100 is performed in some embodiments to write data. Writing user data, which is updating the user data in a memory media component in response to a write request, requires updating the CRC of the affected (i.e., updated) LRAID8+1 sub-stripe and updating the parity of the corresponding whole LRAID16+1 stripe in accordance with the updates.

At operation 1102, a write request is received at the target CXL controller 122. At operation 1104, a corresponding read command is generated by the target CXL controller 122 and/or central controller portion 114 to the media component in LRAID8+1 mode to obtain the LRAID8+1 stripe that includes the user data that is to be updated according to the received write request. The generation of the read command may require that the target CXL controller 122 and/or central controller portion 114 determine the LRAID8+1 sub-stripe in which the user data is to be updated. In contrast to the read operation described in FIG. 10, in this process 1100, the LRAID16+1 stripe parity is also obtained.

At operation 1106, the obtained user data of the LRAID8+1 sub-stripe is stored in cache 126. In some embodiments, the obtained user data of the LRAID8+1 sub-stripe is stored in one cacheline in cache 126. In contrast to the read operation described in FIG. 10, in this process 1100, the LRAID16+1 stripe parity is also obtained and stored in the cache 126. Note that since the write operation necessitates that the LRAID16+1 parity is also updated, the parity data from the LRAID16+1 stripe is also uploaded to the cache (e.g., cache 126) when the LRAID8+1 sub-stripe's user data is uploaded to the cache 126. Note that in some embodiments, considering the two access granularities to be LRAID8+1 and LRAID16+1, the media components only store parity P for the LRAID16+1 stripe and does not store separate parities (Pi and Pj) for the two LRAID8+1 sub-stripes in the LRAID16+1.

At operation 1108, a CRC check is performed on the obtained sub-stripe of user data. In example embodiments, the CRC is calculated for a cacheline, which is a typical granularity of access to media in some embodiments (e.g., 256 bytes corresponding to user data of a LRAID8+1 configuration described in this application). As noted above, in some embodiments, the CRC for a LRAID8+1 sub-stripe may be stored/maintained as metadata in a reserved area in the media and/or in the cacheline in association with the corresponding user data. This operation is similar to the CRC check performed in the read process 1000.

At operation 1110, if the CRC check failed, identifying of the errored user data block and correction is performed by issuing a read retry for the LRAID16+1 stripe to obtain the stripe and stripe parity P (or by obtaining the second sub-stripe only, since the first sub-stripe and stripe parity P are already in cache) in the same manner as described in relation to operations 1012-1018 of process 1000. In some embodiments, the RAID parity is uploaded to cache during the read retry at this step only if the parity is not already in cache. This avoids stressing the media components that stores parity data more than data dice. Persons of skill in the art will appreciate that excessive accesses to memory components can cause errors.

At operation 1112, when the CRC is determined to be correct (either based on check at operation 1108 or after the error detection and correction at operation 1110), the user data is updated in the cache 126. Since the CRC is in the cacheline, the CRC is for the updated cacheline/sub-stripe is updated. The CRC can simply be updated to account for the user data updated by the received write request.

At operation 1114, the LRAID16+1 stripe parity is updated. Note that when the LRAID8+1 sub-stripe was uploaded to cache for the write operation, the corresponding LRAID16+1 stripe parity was also uploaded. The LRAID16+1 parity is updated by adding the delta data to the existing parity.

At operation 1116, the updated sub-stripe and the updated parity are written back from the cache 126 to the corresponding media component, and optionally an acknowledgement is transmitted to the host or other entity that sent the write command. This completes the write operation.

Some embodiments can include ECC encoding the data responsive to the memory controller receiving a request from the host to write the data to the DRAM component. The data can be ECC encoded such that the data can be recovered even if there are errors in the data. In same embodiments, the data can be ECC encoded before the data is written to the DRAM memory device. Some embodiments include encrypting the data. The encryption can be an AES encryption. In some embodiments, the data can be ECC encoded before the data is encrypted. The data can be encrypted by a security component on the memory controller.

The above described embodiments of the present disclosure improve certain aspects of conventional memory access technologies such as, for example, LRAID8+1 and LRAID16+1. The methodology employed in embodiments exploits the performance advantages of the LRAID8+1 and the error protection advantages of the LRAID16+1.

As described above, to response to a typical read request or write request sent from a host to a memory device in a CXL environment is for a user data block of 64 bytes, LRAID systems access an entire stripe in the backend media components. Although the bandwidth observable on the host-memory device interface is that corresponding to the 64 bytes of user data involved in the read or write, the backend bandwidth consumption in LRAID systems is substantially greater, i.e., 64 bytes v 256 bytes in LRAID8+1 and 64 bytes versus 512 bytes in LRAID16+1. Thus, of these two access granularities, LRAID8+1 provides the better performance (e.g., retrieves 256 bytes from the media as compared to the 512 bytes retrieved in LRAID16+1) and LRAID16+1 provides the better bandwidth cost (i.e., lower cost; 32 bytes of parity for 512 bytes of user data (cost of 6.25%), as compared to 32 bytes of parity for 256 bytes of user data (cost of 12.5%)) in the backend.

Described another way, certain embodiments provide the performance of the LRAID8+1 solution as compared to conventional systems, while reducing its bandwidth consumption cost at the backend-media interface. Certain embodiments use the LRAID8+1 granularity to access the media component without the need to retrieve RAID parity data, and use the LRAID16+1 granularity to recover errors that are detected in the LRAID8+1 user data. In order to improve the efficiency of the technique, example embodiments configure the RAID arrays so that, starting from two LRAID8+1 stripes, the parity of the corresponding LRAID16+1 stripe is the sum of the parity of the two LRAID8+1 stripes. Moreover, to further improve the efficiency of the technique, since the most frequent access in usage scenarios is in the LRAID8+1 access granularity, each of the two constituent LRAID8+1 stripes of a larger LRAID16+1 stripe is provided with its own CRC.

Since the occurrence of errors is rare compared to data accesses, by using the LRAID8+1 access granularity (i.e., 256 bytes) to access the data without retrieving RAID parity, and then, only if an error is detected, using a greater access granularity (i.e., 512 bytes) along with the RAID parity to manage that error starting from a retry access, certain embodiments combine advantages of both access granularities.

Whereas all accesses to the media are locked in example embodiments, the locking domain is changed in accordance with the purpose of the access. For example, in an example embodiment in which accesses are made in LRAID8+1 mode or LRAID16+1 mode with a burst length of 8 bytes and a access block size of 1 byte, the locking domains may have different byte values for the different types of accesses: 8 bytes for read access, which amounts to locking a byte from each of 8 media components in the LRAID8+1 stripe; 9 bytes for write access, which amounts to locking each of 8 media components storing user data and the corresponding parity media component in the LRAID8+1 stripe; and 17 bytes for error recovery access in the LRAID16+1 stripe.

Example embodiments were described above primarily in relation to the CXL 2.0 and/or 3.0 specifications. Moreover, some of the described embodiments described a CXL Type 3 memory device communicating with a host. It will, however, be understood that embodiments are not limited to the CXL or the CXL versions that are specifically mentioned here. Moreover, example embodiments may be applicable to devices other than memory devices.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

It should be noted that the methods described above describe possible implementations, and that the operations and the steps may be rearranged or otherwise modified and that other implementations are possible. Further, portions from two or more of the methods may be combined.

For example, the various illustrative blocks and components described in connection with the disclosure herein may be implemented or performed with circuitry such as a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory access method, comprising:
    in response to a memory access request, obtaining, using a first access granularity, a sub-stripe from a stripe of data stored on a plurality of memory media components arranged in a redundant array of independent data (RAID);
    detecting an error in the sub-stripe of the data; and
    in response to the detecting the error, obtaining, using a second access granularity, the stripe of the data from the plurality of memory media components, wherein the second access granularity is larger than the first access granularity.

2. The memory access method according to claim 1, the method further comprises: identifying, in the sub-stripe, a location of the error using the stripe obtained using the second access granularity and parity information of the stripe.

3. The memory access method according to claim 1, further comprising: notifying a sender of the memory access request, by sending a Compute Express Link™ (CXL™) message, information about the detected error.

4. The memory access method according to claim 1, wherein the CXL message is in accordance with a reliability, availability and serviceability (RAS) capability of a CXL protocol.

5. The memory access method according to claim 1, wherein the method further comprises storing the sub-stripe in a cache, and wherein the first access granularity or the second access granularity corresponds to a size of a cache-line of a cache.

6. The memory access method according to claim 1, wherein the memory access request is a read request or a write request, and wherein when the memory access request is a write request the obtaining, using the first access granularity, the sub-stripe comprises obtaining user data blocks of the sub-stripe and parity information of the stripe, and when the memory access request is a read request the obtaining, using the first access granularity, the sub-stripe comprises obtaining user data blocks of the sub-stripe without the parity information of the stripe.

7. The memory access method according to claim 1, wherein a number of memory media components of the RAID accessed using the first access granularity is less than a number of memory media components of the RAID accessed using the second access granularity.

8. The memory access method according to claim 7, wherein the number of memory media components of the RAID accessed using the second access granularity is n times the number of memory media components of the RAID accessed using the first access granularity, wherein n is a multiple of 2.

9. The memory access method according to claim 1, wherein the detecting an error comprises detecting the error based on error correction information associated with the sub-stripe.

10. The memory access method according to claim 1, wherein the stripe of data includes a plurality of blocks of the data, and wherein each block of the plurality of blocks and parity information of the stripe are stored on respective memory media components of the plurality of memory media components.

11. The memory access method according to claim 1, wherein the obtaining, using the first access granularity, the sub-stripe and obtaining, using the second access granularity, the stripes are in accordance with a locked RAID (LRAID) access.

12. The memory access method according to claim 1, wherein a size of a block of data in the memory access request is 64 bytes, a size of the first access granularity is 256 bytes, and a size of the second access granularity is 512 bytes.

13. The memory access method according to claim 1, wherein the method is performed by a memory controller in a device configured to operate as a CXL Type 3 device.

14. The memory access method according to claim 1, wherein the memory media components are dynamic random access memory (DRAM) media.

15. A device, comprising:
    a host interface that includes a plurality of input/output (I/O) lanes configured to couple to a host device;
    a physical (PHY) layer interface configured to couple to a plurality of memory media components; and
    control circuitry configured to perform operations comprising:
        in response to a memory access request received over the host interface, obtaining, using a first access granularity and the PHY layer interface, a sub-stripe from a stripe of data stored on the plurality of memory media components arranged in a redundant array of independent data (RAID);

detecting an error in the sub-stripe of the data; and in response to the detecting the error, obtaining, using a second access granularity and the PHY layer interface, the stripe of the data from the plurality of memory media components, wherein the second access granularity is larger than the first access granularity.

16. The device according to claim 15, wherein the control circuitry is further configured to identify, in the sub-stripe, a location of the error using the stripe obtained using the second access granularity and parity information of the stripe.

17. The device according to claim 15, wherein the central controller is further configured to notify a sender of the memory access request, by sending a Compute Express Link™ (CXL™) message, information about the detected error.

18. The device according to claim 15, wherein the CXL message is in accordance with a reliability, availability and serviceability (RAS) capability of a CXL protocol.

19. The device according to claim 15, wherein the device further comprises a cache, wherein the central controller is further configured to store the sub-stripe in the cache, and wherein the first access granularity or the second access granularity corresponds to a size of a cacheline of a cache.

20. The device according to claim 15, wherein the control circuitry is further configured to separately access in accordance with locked RAID (LRAID) access, in each memory media component of the plurality of memory media components, the stripe, each of a plurality of sub-stripes of the stripe, and a parity of the stripe.

* * * * *